United States Patent
Batiste et al.

(10) Patent No.: US 9,378,654 B2
(45) Date of Patent: Jun. 28, 2016

(54) SYSTEM AND METHOD FOR RENDERING MUSIC

(71) Applicant: D2L CORPORATION, Kitchener (CA)

(72) Inventors: David Batiste, Kitchener (CA); Jeffrey Geurts, Kitchener (CA); Steve Schoger, Kitchener (CA)

(73) Assignee: D2L CORPORATION, Kitchener, Ontario (CA)

( * ) Notice: Subject to any disclaimer, the term of this patent is extended or adjusted under 35 U.S.C. 154(b) by 0 days.

(21) Appl. No.: 14/311,740

(22) Filed: Jun. 23, 2014

(65) Prior Publication Data

US 2015/0371550 A1    Dec. 24, 2015

(51) Int. Cl.
  *G09B 15/02*    (2006.01)

(52) U.S. Cl.
  CPC .................................... *G09B 15/023* (2013.01)

(58) Field of Classification Search
  CPC ..................................................... G09B 15/023
  See application file for complete search history.

(56) References Cited

U.S. PATENT DOCUMENTS

| | | | | |
|---|---|---|---|---|
| 5,590,282 A * | 12/1996 | Clynes | ............................. | 725/87 |
| 6,211,451 B1 * | 4/2001 | Tohgi et al. | .................. | 84/470 R |
| 6,580,805 B1 * | 6/2003 | Nakano | .......................... | 382/100 |
| 6,635,815 B2 * | 10/2003 | Kosakaya | ................ | G10G 1/00 |
| | | | | 84/471 R |
| 7,094,960 B2 * | 8/2006 | Ikeya et al. | .................. | 84/471 R |
| 7,371,959 B2 * | 5/2008 | Hiratsuka | ............... | G06F 21/10 |
| | | | | 705/51 |
| 8,552,281 B1 * | 10/2013 | Cotrone | ................. | G09B 15/00 |
| | | | | 84/477 R |
| 8,908,567 B2 * | 12/2014 | Mikkelsen et al. | ........... | 370/259 |
| 9,142,201 B2 * | 9/2015 | Good | ..................... | G09B 15/04 |
| 9,147,352 B1 * | 9/2015 | Cotrone | ................. | G09B 15/00 |
| 9,202,448 B2 * | 12/2015 | Morell | ................. | G10H 1/0025 |
| 2006/0284745 A1 * | 12/2006 | Cameron | ......................... | 341/50 |
| 2008/0046686 A1 * | 2/2008 | Cameron | ......................... | 712/22 |
| 2008/0302233 A1 * | 12/2008 | Ding et al. | ...................... | 84/609 |
| 2009/0125799 A1 * | 5/2009 | Kirby | .............................. | 715/234 |
| 2014/0000438 A1 * | 1/2014 | Feis et al. | ......................... | 84/453 |
| 2014/0260904 A1 * | 9/2014 | Daniels | ........................ | 84/483.2 |
| 2015/0059558 A1 * | 3/2015 | Morell et al. | ................... | 84/609 |
| 2015/0095822 A1 * | 4/2015 | Feis et al. | ........................ | 715/765 |
| 2015/0371550 A1 * | 12/2015 | Batiste | ................. | G09B 15/023 |
| | | | | 84/483.2 |

* cited by examiner

*Primary Examiner* — Robert W Horn
(74) *Attorney, Agent, or Firm* — Gowling WLG (Canada) LLP; Neil Henderson (57) ABSTRACT

A system and method for rendering music is provided. The method includes: receiving a request for electronic content; parsing the electronic content to determine a music notation element; translating the music notation; creating a music notation object based on the translation; and rendering the music notation object via a browser application. The system includes: a connection module configured to receive a request for electronic content; a parser configured to parse the electronic content to determine a music notation element; an object module configured to translate the music notation and create a music notation object based on the translation; and a rendering module configured to render the music notation object to be displayed by a browser application.

22 Claims, 6 Drawing Sheets

SYSTEM AND METHOD FOR RENDERING MUSIC

FIELD

The present disclosure relates generally to online music delivery. More particularly, the present disclosure relates to a system and method for rendering music on a browser.

BACKGROUND

Users have been accessing online networks, such as the Internet, to obtain a variety of services and information. As the types of information accessible via online networks increases, users are becoming more and more accustomed to being able to view and be presented with all types of information. Frequently, webpages or websites make use of music or videos that may play when a user accesses the website.

Music notation or musical notation, a visual representation of aurally perceived music, is generally rendered on webpages using rich Internet applications, for example Flash, Java applets, Silverlight, or the like. These technologies may require additional components to be installed on the user's device browser accessing the webpage or may not function properly on a non-compatible browser.

There is an Extensible Markup Language (XML) specification, referred to as MusicXML, which is adapted to describe music. Although several authoring tools support MusicXML, it is generally not supported by Internet browser applications. As such, music may be created in an authoring tool but when exported to be viewed online, the music notations are generally rendered as an image or similar format by a third-party application, plug-in or extension and not by the browser application. Generally, an author of a web page may need to use a tool provided by a third-party to generate a visual representation of the music and then make an effort to embed the visual representation into a web page as an image or similar format.

The above information is presented as background information only to assist with an understanding of the present disclosure. No determination has been made, and no assertion is made, as to whether any of the above might be applicable as prior art with regard to the present disclosure.

It is, therefore, desirable to provide an improved system and method for rendering music to be viewed over a computer network.

SUMMARY

In a first aspect, the present disclosure provides a method for rendering music notation including: receiving a request for electronic content; parsing the electronic content to determine a music notation element; translating the music notation; creating a music notation object based on the translation; and rendering the music notation object via a browser application.

In a particular case, the translating the music notation may include translating the music notation into HTML containing Unicode characters.

In anther particular case, the music notation object may be a JavaScript object.

In still another particular case, the music notation may represent a multi-part music composition.

In yet another particular case, the rendered music notation object may be navigable via an input device of a user device.

In still yet another particular case, creating of a music notation object may include mapping notes within the music notation to notes within a musical font.

In a particular case, the method may further include creating an assistive technology element accessible by assistive technology.

In another particular case, the assistive technology element may be an off-screen element.

In yet another particular case, the assistive technology element may include phonetic terms to describe the music notation.

In still another particular case, the assistive technology element may include phonetic terms to describe Unicode characters and combination of Unicode characters.

In still yet another particular case, the assistive technology element may include a plurality of rendering options to describe the music notation.

In a particular case, the method may further include determining an audio rendering of the music object.

In a further aspect, there is provided a system for rendering music notation including: a connection module configured to receive a request for electronic content; a parser configured to parse the electronic content to determine a music notation element; an object module configured to translate the music notation and create a music notation object based on the translation; and a rendering module configured to render the music notation object to be displayed by a browser application.

In a particular case, the object module may be configured to translate the music notation to HTML containing Unicode characters.

In another particular case, the object module may be further configured to create an assistive technology element accessible by assistive technology.

In still another particular case, the assistive technology element may include phonetic terms to describe the music notation.

In yet another particular case, the assistive technology element may include phonetic terms to describe Unicode characters and combination of Unicode characters.

In still yet another particular case, the object module may be further configured to mapping notes within the music notation to notes within a musical font.

In another particular case, the rendering module may be further configured to determine an audio rendering of the music object.

In a further embodiment, there is provided a method for editing music notation including: providing a graphical user interface to a user; receiving user input relating to music notation; generating a music notation object based on the music notation; and storing the music object.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

The following description with reference to the accompanying drawings is provided to assist in a comprehensive understanding of example embodiments as defined by the claims and their equivalents. The following description includes various specific details to assist in that understanding but these are to be regarded as merely examples. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding. Accordingly, it should be apparent to those skilled in the art that the following description of embodiments is provided for illustration purposes only and not for the purpose of limiting the invention as defined by the appended claims and their equivalents.

Generally, the present disclosure provides embodiments for a method and system for rendering music notation, for example, staff notation, letter notation, tablature, chord diagrams, instrument specific notation, or the like, in a browser. The system is configured to receive a MusicXML notation element or other MusicXML content. The system further parses the MusicXML notation and creates a music object, for example by translating the MusicXML to create an JavaScript object that may be rendered as HTML containing Unicode characters or the like for display by a browser application. The system is configured to render the music notation object or provide a browser application with the object to be rendered for a user.

The embodiments of the method and system are further configured to provide accessibility to music notation for assistive technologies, for example, screen readers. Conventional screen readers do not have the ability to describe music notation when displayed as an image or other similar format on a webpage or web site. A user, who benefits from or requires a screen reader to describe the elements onscreen, may not receive the music information if the music notation is rendered as an image, inaccessible to the assistive technology. The embodiments of the method and system provided herein are intended to provide assistive technology elements, for example an HTML text object, accessible to the assistive technology that may be read or interpreted by the assistive technology. In some cases, the assistive technology elements may be off-screen, for example, not rendered in a display area, but may be accessible to the assistive technology and may contain, for example, phonetic terms used to describe the music notation.

The embodiments of the method and system provided herein may further be configured to provide an editor for music wherein the editor is configured to provide users with a graphical user interface (GUI) to edit music notation. In some cases, the editor may be browser enabled and may allow for online editing of music notation.

Figure 1:
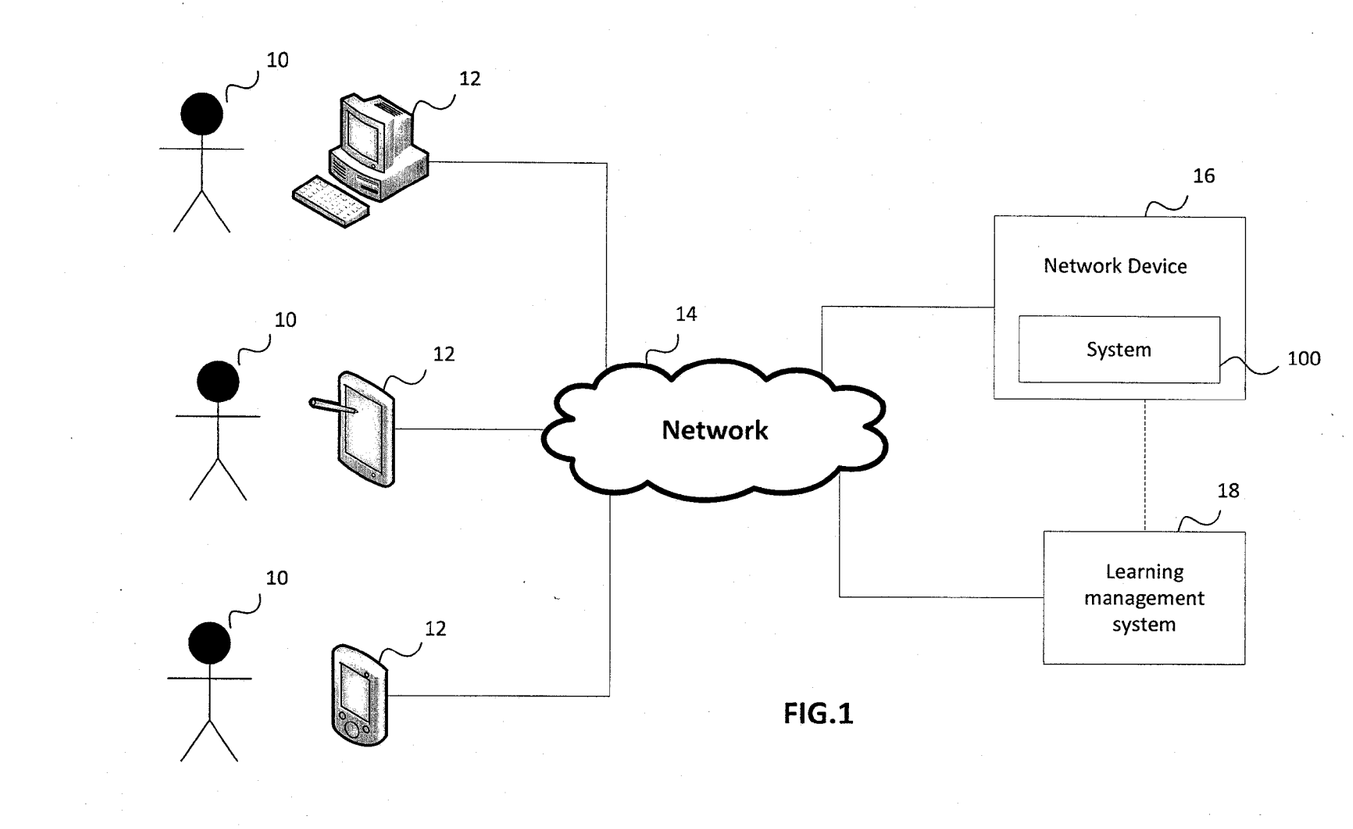
FIG. 1 is a figure illustrating an example environment for a system for rendering music notation according to an embodiment.

FIG. 1 illustrates an example environment for an embodiment of a system 100 for rendering music.

Users 10 use user devices 12, for example, a desktop computer, a tablet, a notebook computer, a netbook, a smart phone, or the like, to access a network 14, for example, the Internet, a local area network (LAN), a virtual local area network (VLAN), a virtual private network (VPN), or the like. Users 10 access data and content hosted on network devices 16, for example servers, a learning management system 18, or the like, via the network 14.

Users 10 may wish to access web pages or websites in a view to retrieving more information on, for example, a specific piece of music, music notation generally, or the like. The music notation may be rendered by a browser application on the user device 12. In some cases, the user may further wish to edit the music notation online, via an editor provided by the system 100. In other cases, the user may be using assistive technology and may wish to be provided with a description of the music notation.

Figure 2:
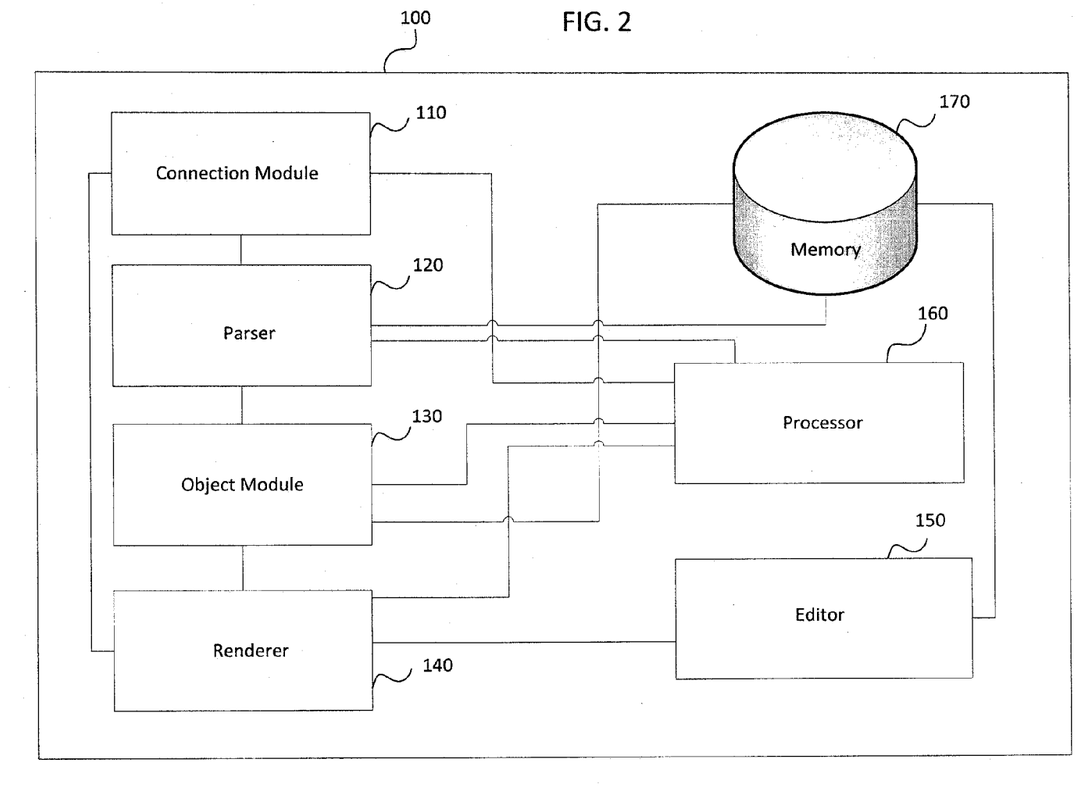
FIG. 2 illustrates a system for rendering music notation according to an embodiment.

FIG. 2 illustrates an embodiment of the system 100 for rendering music notation. The system 100 includes a connection module 110, a parser 120, an object module 130, a renderer 140, an editor 150, a processor 160 and a memory module 170.

The connection module 110 is configured to receive transmissions from and send transmissions to a network. The connection module 110 will receive a request for electronic content which includes a music element, for example a MusicXML object, or a music notation image, or the like, from a user device 12 via the network 14. The connection module 110 is further configured to retrieve the requested electronic content from a network device hosting the content. In some cases, the connection module 110 may be configured to retrieve the requested content from the memory module 170 if the system 100 is a component within the network device hosting the content.

The parser 120 is configured to receive the requested content and parse at least one music element within the electronic content. The parser 120 is configured to determine music elements developed, implemented, or displayed in MusicXML or similar language. In some cases, the parser 120 determines the MusicXML embedded in the electronic content and translates the music element to an object that may be rendered or further manipulated to a desired output, for example, HTML containing Unicode characters, or the like. In other cases the parser 120 parses the electronic content to determine or extract the at least one music element embedded in the electronic content.

The object module 130 is configured to generate or further manipulate the object created by the parser to a music notation object, for example, a JavaScript™ object that may be rendered as HTML containing Unicode characters and may be rendered in a browser configured to display the electronic content. The parser 120 is operatively connected to the object module 130 and may transmit or otherwise provide the object module with the music element or object. The object module 130 generates a music notation object, for example a JavaScript™ object, which may be rendered as an HTML containing Unicode characters, which may be displayed by a browser application. It is intended that the browser application may natively render the music notation object without the addition of further plug-ins or through the use of other applications, such as, Flash, Java applets, Silverlight, or the like. The HTML or Unicode characters may be, for example, stored in the memory module 170 and retrieved by the object module 130 when generating the music notation object.

The renderer 140 receives the music notation object from the object module 130 and provides for the rendering of the music notation object with the electronic content. The renderer 140 is configured to embed, render, or otherwise include the music notation object in the requested electronic content such that the music notation object may be displayed by a browser application on the user device. In some cases, the music notation object may include data designed to be rendered off-screen to be accessible to assistive technology or the music notation object may be associated with a separate assistive technology element configured to be accessible to the assistive technology.

In some cases, the system 100 may include the editor 150 to allow users to edit a music notation object or create a new music notation object. The editor 150 is configured to provide a Graphical User Interface (GUI) to a user via the user device and accept input from the user via the user's interaction with the GUI. The editor 150 is further configured to create a music notation object or modify an existing music notation object based on the user's input via the GUI. It is intended that the music notation object created or modified may be rendered online by various types of browser application, by for example, creating a JavaScript object or other object that may contain HTML with Unicode characters such that the music notation object may be rendered by a browser application alone or embedded within other electronic content, without the requirement of further plug-ins or applications.

The system 100 further includes the processor 160. The processor 160 is configured to execute instructions from the other modules of the system 100. In some cases, the processor may be a central processing unit. In other cases, each module may be operatively connected to a separate processor.

It will be understood that in some cases, the system 100 may be a distributed system wherein the modules may be operatively connected but may be hosted over a plurality of network devices.

In some cases, the modules may be extensible, for example, the parser, renderer or musical notation outputs may be extended by others, for example, users, vendors, third-parties, or the like. It is intended that the system 100 provided herein would be accessible by others and may be extended through the use of an application programming interface (API) or similar technology.

Unicode characters are a standard set of characters with widespread use in software development. Unicode characters map characters and symbols used in language, mathematics, music and the like to machine readable values. As the Unicode characters are a universal mapping, the machine readable values are able to be used in multiple languages. The Unicode Standard has a range of character codes that have been predefined for musical symbols. In some cases, a plurality of character codes may be combined to create a specific note or musical symbol required or requested to be displayed.

In an example embodiment, the system 100 may include a musical icon font, typeface, typestyle or the like that may include the musical notation representation of the Unicode characters and the musical notation representation of combinations of Unicode characters to be displayed as staff notation, letter notation, tablature, chord diagrams, instrument specific notation, or the like. The font may be stored in the memory module 170 and may be retrieved by the modules of the system. The font may be considered as an icon font and is intended to be rendered using, for example, HTML and Cascading Style Sheets (CSS), or other markup language and style sheet language that may then be rendered by a browser application.

It is intended, that by creating a music notation object that is able to be rendered by a markup language and style sheet language, the music notation object may be navigable by a keyboard, mouse, touch screen, or other user device input mechanism.

Figure 3:
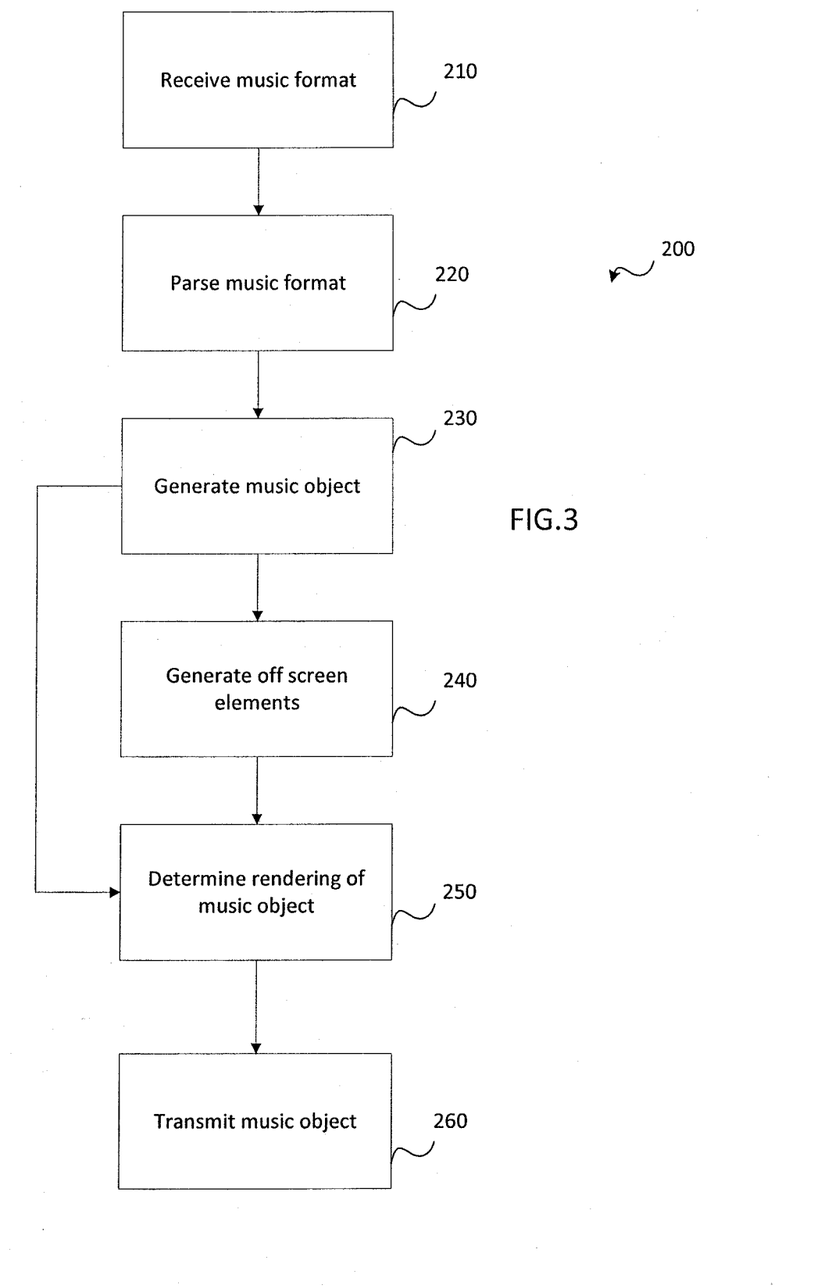
FIG. 3 is a flow chart illustrating a method for rendering music notation according to an example embodiment.

FIG. 3 illustrates a flow chart for a method 200 for rendering music notation. The music notation is intended to be rendered by a browser application installed on or associated with the user device 12.

At 210, the connection module 110 receives a request for electronic content, from, for example, a user device, a network device or the like. The requested electronic content is determined to include at least one music element, for example a MusicXML object.

At 220, the parser 120 parses the request electronic content to determine the music element and parse any music element from the electronic content. The parser 120 may be further configured to transmit the music element to the object module 130.

At 230, the object module 130 is configured to generate a music notation object from the music element parsed from the requested electronic content or translate the music element to a music notation object. In some cases, the object module 130 may map the music element or notes within the musical element to associated Unicode characters within the musical symbol range. In other cases the object module 130 may map the music element or notes within the musical element to characters within a musical icon font which may be stored in the memory module 170 and may contain representations of the musical Unicode characters and combination of the musical Unicode characters.

In one example, to generate a visualization of music (for example, as staff notation) the system 100 implements code, such as an algorithm that takes the music object (for example, a JavaScript object) and determines the object's representation in musical Unicode characters. Determining the object's representation may include determining the position, visually, on the staff, as well as which Unicode character is desired, and the staff itself must also be constructed. For instance, to display a C note on the staff, the system 100 determines the combination of Unicode characters needed, and how to position the characters on the staff. In some cases, the system may determine that there is a need for one character for the note head, and another for the shaft. There could be other considerations, such as the effects of elements around the C note or other contextual information such as the scale, the timing, and the like.

At 240, the object module 130 may further generate at least one assistive technology element associated with the music notation object, which may be an off-screen element. It is intended that the assistive technology elements may be generated in order for the music notation to be read or accessed by assistive technology. Although a musical icon font or Unicode characters may be machine readable and renderable in a browser application, these objects may still have difficulties being accessed and/or understood by assistive technology, for example a screen reader or the like. As it is intended that the musical notation object be read and understood, having the assistive technology merely recite Unicode characters (hexadecimal numbers) or attempt to read icons, may not be an accurate or an understandable representation of the music notation.

It is intended that the object module 130 may generate the assistive technology element where plain language may be mapped to the musical notation such that the assistive technology can accurately render the music object. For example, if the onscreen rendering of the music notation object is a staff notation illustrating various notes on a treble clef with a specific time signature, the assistive-technology element may include a plain language description of the staff notation, including the clef, the notes, the time signature and the like. For example, the icon font or the Unicode characters may be mapped to wording or text that explains or details the notation used. An example mapping table is shown as Table 1. It will be understood that for the language to be natural sounding, the assistive technology would pair symbols and notes. Additionally, combinations of otherwise simple music notes may result in complex wordage.

TABLE 1

Mapping table

| Unicode | Symbol | Word |
|---------|--------|------|
| 266D | ♭ | Flat (most likely paired with a note) |
| 266E | ♮ | Natural (most likely paired with a note) |
| 266F | ♯ | Sharp (most likely paired with a note) |
| 1D15D | 𝅝 | Whole note (which would be qualified by the note on the staff) |
| 1D13D | 𝄽 | Quarter rest |
| 1D13F | 𝄿 | Sixteenth rest |

At 250, the renderer 140 determines the rendering of the music notation object, for example, how the music notation object is to be rendered or associated with the electronic content such that the music notation object can be displayed by a browser application on the user device. The renderer 140 may embed or render the music notation object into the requested electronic content, which may replace the music element parsed from the electronic content by the parser 120. In some cases, the renderer 140 may include any assistive technology element generated by the object module 130 and associated with the music notation object.

At 260, the connection module 110 transmits the requested electronic content with the music notation object to the user device to be displayed to the user, via a browser application or the like.

Figure 4:
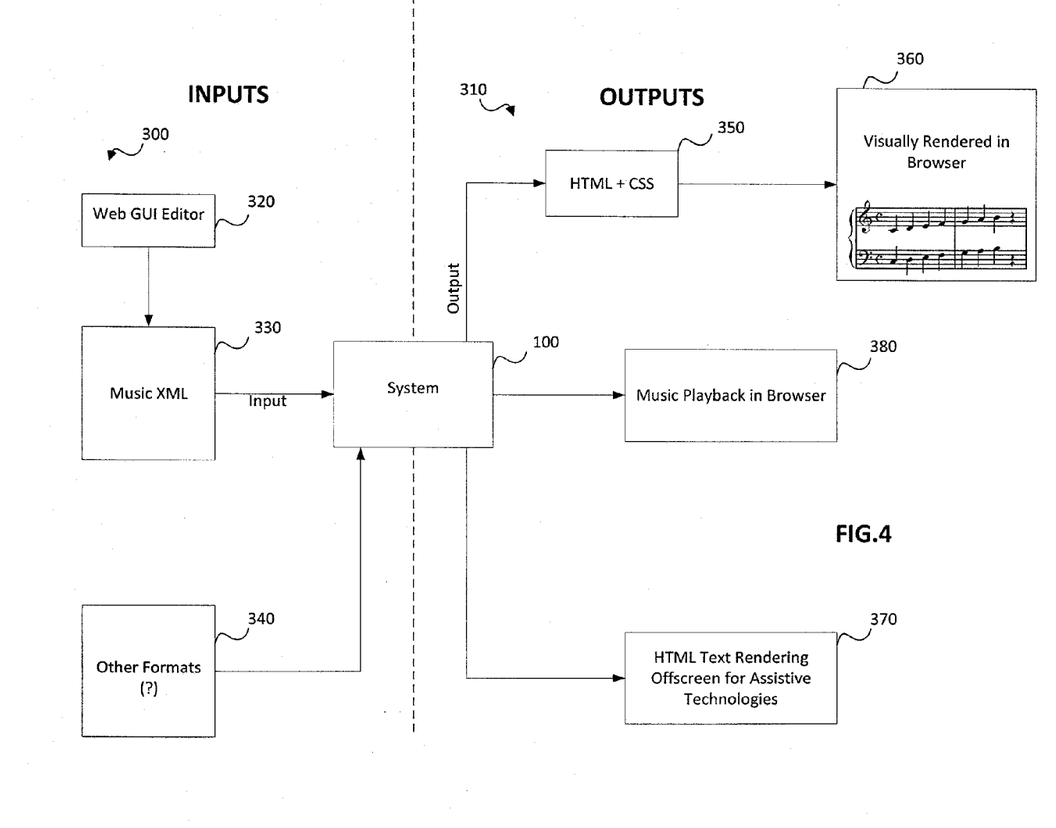
FIG. 4 illustrates the inputs and outputs for a system for rendering music notation according to an example embodiment.

FIG. 4 illustrates the inputs 300 and outputs 310 of a system 100 for music notation rendering.

The connection module 110 of the system may receive inputs, for example, requests for electronic content which include MusicXML elements 320. In some cases, the MusicXML element may be created or edited using an online GUI editor, which may be rendered or managed by the editor 150 of the system, as described herein. In other cases, the system 100 may receive other formats of music elements and may parse these other formats from the request for electronic content.

The system 100 receives the inputs 300 and is configured to produce outputs 310, for example, HTML and CSS elements 350 that are configured to be visually rendered as a music notation object 360 in a browser application. It will be understood that the music notation object may include various music aspects, for example, multi-part music, chord diagrams, tablature, tied notes, accidentals, key signatures, time signatures, note relationships, dynamics, articulation marks, ornaments, or the like.

In some cases, the system 100 may also output at least one assistive technology element, for example an HTML text rendering that may be accessed and read by assistive technologies. It is intended that the assistive technology element be phonetically correct and the verbiage or language to be used for the assistive technology element may be stored in the memory module 170 and mapped to the various music symbols used in the music notation.

In some cases, the system 100 may also output an audio music playback that can be played in the browser application. As the music notation is representative of specific musical performance, the system 100 may be able to determine an audio rendering of the music notation. In some cases, if the music notation is instrument specific, the audio rendering may be of the specific instrument noted in the music notation. In other cases, as audio playback occurs, the relevant measure and/or relevant notes within the measure may be highlighted visually. In some cases, the browser application may allow the user to select whether to enable an audio rendering or to simply view the rendered music notation.

In an example, the system 100 may render a music notation object that may be a multi-part music notation, for example containing a guitar, a piano and vocal representation within the music notation. The music notation may be rendered as a three-part staff notation illustrating the different notes and measures per part. The system 100 may further render an audio playback of the music notation in which all of the three parts are rendered together in harmony. In other cases, the system may provide a feedback option to the user, via the user device, and the user may select a specific part of the music notation, for example the piano part, to be rendered without the other parts.

The system 100 may also render an assistive technology element describing the three part music notation, by creating an off-screen element having the description of the music notation. In some cases, the system 100 may generate the assistive technology element such that each part of the music is read consecutively. In other cases, the system 100 may generate the assistive technology element such that the text rendering describes certain measure of one part prior to describing the corresponding measures of the other parts. In still other cases, the system 100 may request feedback from the user to determine how the user wishes to receive the description of the music notation. For example, the system 100 may state that the music notation is a multi-part music notation with a guitar, a piano and a vocal element and the system may then request that the user select a part to be rendered or described first.

Figure 5:
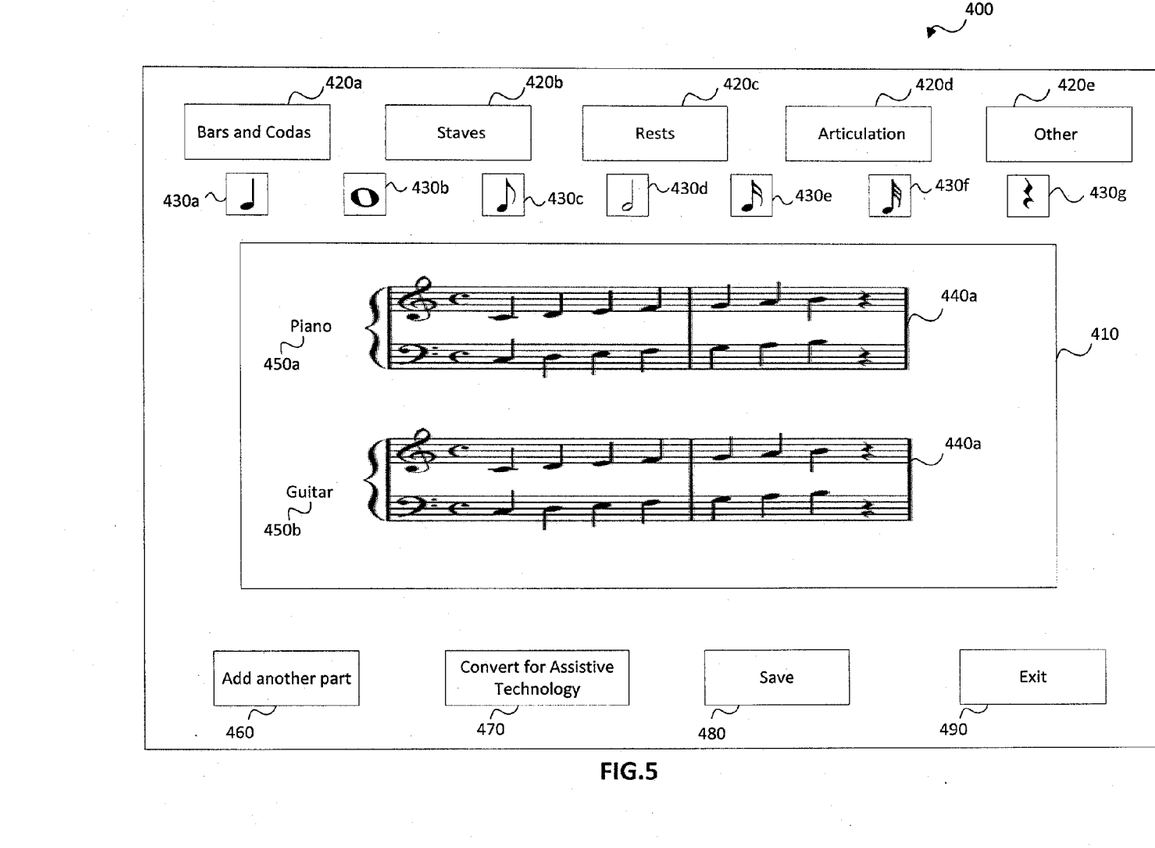
FIG. 5 illustrates an example graphical user interface of an editor for a system for rendering music notation according to an embodiment.

FIG. 5 illustrates a Graphical User Interface (GUI) 400 of an editor for rendering music according to an embodiment. The GUI 400 is intended to provide a user with an online music creation tool, where the user can drag and drop music notation symbols to create or edit music.

The GUI 400 includes a display area 410, which is configured to display the music notation created by or being edited by the user. The GUI 400 further includes symbol or notation inputs 420a to 420e, for example, buttons, drop down menus, pop-up menus or the like. The notation inputs 420a to 420e may include specific notation symbols, where, for example, the user may drag and drop the symbol onto the staff notation, or may contain a list of symbols or a search function where the user can look for a desired symbol. As shown in FIG. 5, the symbols may be grouped by category and each category may include a plurality of symbols that the user may access and include in the music notation.

The GUI 400 includes note buttons 430a to 430g. Although, only a subset of possible notes are shown, it will be understood that more or fewer buttons could be included, and on pressing a button, the user may be provided with similar notes, for example, in a drop down menu. It is intended, that on pressing or otherwise activating the button, the user may drag the note to the display area 410 and place the note in a desired location.

The GUI 400 displays at least one staff notation 440a or 440b, and may display other notations as requested by the user. In some cases, the GUI 400 may display multiple notations, for example, a staff notation per instrument 440a and 440b. The GUI 400 may further include part identification 450a and 450b associated with the staff notations 440a and 440b. The GUI 400 may also include a button 460 or other input to allow the user to add an additional staff notation for another instrument or to create a different notation to append to the currently displayed notations, for example, including a chord notation for a guitar.

The GUI 400 may include standard function buttons, for example a save button 480 and/or an exit button 490. In some cases, on activating the exit button 490, the user may be asked whether the user would like to save the music notation prior to exiting. In other cases, the music notation may be automatically saved, for example, after being opened for a predetermined amount of time, for example, every minute, every 5 minutes, every 10 minutes or the like. In some cases, on saving the music notation, the user may be asked whether the user wishes to save the notation in MusicXML format or as an Internet accessible object, for example a JavaScript™ object.

Another input or button 470 may be included to allow the user to create or convert the music notation to include an element that may be accessed or understood by assistive technology. In some cases, on the user saving or exiting the editor, the user may be prompt as to whether the user would like to convert or create an assistive technology element associated with the music notation. In other cases, an assistive technology element may be created without the user's knowledge to allow access to a description of the musical technology for assistive technology.

It is intended, that once the music notation is saved, it may be associated with or embedded into electronic content that may be rendered online. In some cases, on saving or exiting the editor, the user may be provided with an input option where the user may associate the music notation with electronic content by selecting or otherwise identifying the electronic content to be associated with the music notation. In some cases, depending on the electronic content being associated with the music notation, the editor may determine which would be more appropriate. For example, the editor may save the music notation as a MusicXML format if the music notation is to be associated with a presentation or a text document, but may be saved as an Internet accessible object if the music notation is being associated with online electronic content.

In some cases, the GUI may provide for visual error checking with respect to the music notation. For example, the staff notation may include a timing notation and the editor may review the various bars of music to determine whether the music noted on the staff notation correlates to the timing notation. If the music does not correlate, the bars containing inappropriate timing may be highlighted to be easily found and viewed by the user.

In some cases, a user may be able to navigate the music notation with an input device, for example a keyboard, mouse, or the like, controlling the audio rendering or playback speed. In an example, the user using the left and right arrow keys to move between measures, each measure playing back as the note receives the user's focus. Similarly, the user could navigating between notes, by, for example, holding a second key while using the arrow keys. In another example, the user may edit the music on the fly, playing with the notes, the timing, or the like.

Figure 6:
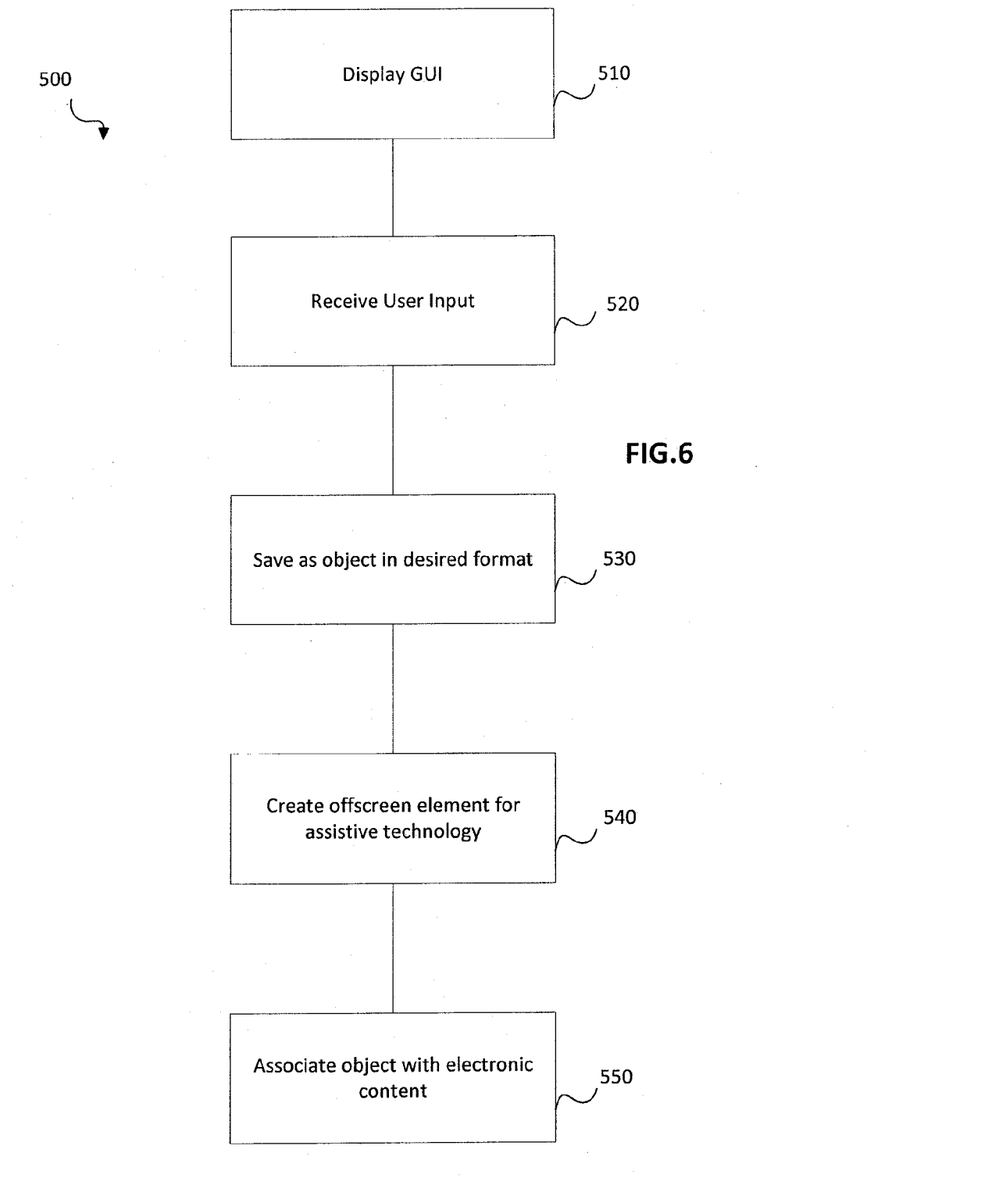
FIG. 6 is a flow chart illustrating a method for editing music notation according to an example embodiment.

FIG. 6 illustrates a method 500 for editing music according to an embodiment.

At 510, the editor 150 provides for the GUI 400 to be displayed to a user. The user may view the editor via a window of an online browser on a user device or the user may download onto the user device an application which provides for a local copy of the editor to be installed on the user device and display the GUI 400 when accessing the application.

At 520, the editor 150 receives user input. The user input may be the user editing or creating the music notation through the input options provided by the GUI. The editor 150 is configured to display, in the display area 410, the edits being made to the music notation.

At 530, the editor 150 is configured to save the music notation, by, for example, creating a music notation object of the music notation. In some cases, the editor 150 may have the object module 130 create the music notation object then save the music notation object to the memory module 170. In other cases, the music notation object may be saved to a local memory module of the user device. The editor 150 may automatically determine the format of the music notation, for example, automatically save it as a MusicXML file, or may ask the user to specify the format of the object.

At 540, the editor 150 may create an assistive technology element that may be accessible by assistive technology. In some cases, the editor 150 may prompt the user to determine whether the user wishes to have an associated assistive technology element with the music notation. In other cases, the editor 150 may create and associate an assistive technology element with the music notation automatically.

At 550, the editor 150 may be configured to associate or embed the music object into associated electronic content. In some cases, associating or embedding the music object into associated electronic content may be performed by a third-party application, for example a web page development application. In other cases, the user will be provided with a prompt or otherwise specify which electronic content to associate with the music object.

In a specific example, the system and method for rendering music notation may be used within a learning management system. An institution may provide courses or seminars in music, for example, music theory, music writing, music interpretation, or the like, and may have a desire for students and instructors within the course to have the ability to review and display music notation on a computer network. By having the music notation rendered by a browser application, students and instructors may have the ability to review and edit music without the requirement for additional applications being installed on the user devices. Students create or edit specific music notation as an assignment and provide the instructor with the music notation via a computer network. Further, the instructor may be able to render student assignments on the user device and navigate through the music notation in order to mark the assignments.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for rendering music notation comprising:
receiving, by a server, a request for electronic content, the request being communicated to the server by a client;
obtaining, by the server, one or more files associated with the electronic content from a storage unit;
parsing, by the server, one or more files associated with the electronic content to determine a music notation element;
translating, by the server, the music notation from a first format to a second format that is supported by a browser application;
creating, by the server, a music notation object based at least in part on the translation; and
sending, by the server, the music notation object to the client, wherein the client renders the music notation object via the browser application.

2. The method of claim 1, wherein the translating the music notation comprises translating the music notation into HTML containing Unicode characters.

3. The method of claim 1, wherein the music notation object is a JavaScript object.

4. The method of claim 1, wherein the music notation represents a multi-part music composition.

5. The method of claim 1, wherein the rendered music notation object is navigable via an input device of a user device.

6. The method of claim 1, wherein the creating of a music notation object further comprises mapping notes within the music notation to notes within a musical font.

7. The method of claim 1, further comprising:
creating an assistive technology element accessible by assistive technology.

8. The method of claim 7, wherein the client renders the music notation object via the browser application on a screen operatively connected to the client, and wherein the assistive technology element is an off-screen element.

9. The method of claim 7, wherein the assistive technology element comprises phonetic terms to describe the music notation.

10. The method of claim 7, wherein the assistive technology element comprises phonetic terms to describe Unicode characters and combination of Unicode characters.

11. The method of claim 7, wherein the assistive technology element comprises a plurality of rendering options to describe the music notation.

12. The method of claim 1, wherein the second format in which the music notation is rendered is readable by an assistive technology such that a description of a staff notation of music corresponding to the electronic content is extracted.

13. The method of claim 12, the staff notation includes information associated with a cleff, one or more notes, and a time signature.

14. The method of claim 12, wherein the assistive technology corresponds to a screen-reader.

15. The method of claim 1, further comprising:
determining an audio rendering of the music object.

16. A system for rendering music notation comprising:
one or more processors configured to:
receive a request for electronic content, the request being communicated to the server by a client;
obtain one or more files associated with the electronic content from a storage unit;
parse one or more files associated with the electronic content to determine a music notation element;
translate the music notation from a first format to a second format that is supported by a browser application;
create a music notation object based at least in part on the translation; and
send the music notation object to the client, wherein the client renders the music notation object via the browser application; and
one or more memories coupled to the one or more processors, configured to provide the one or more processors with instructions.

17. The system of claim 16, wherein the one or more processors are further configured to translate the music notation to HTML containing Unicode characters.

18. The system of claim 16, wherein the one or more processors are further configured to create an assistive technology element accessible by assistive technology.

19. The system of claim 18, wherein the assistive technology element comprises phonetic terms to describe the music notation.

20. The system of claim 18, wherein the assistive technology element comprises phonetic terms to describe Unicode characters and combination of Unicode characters.

21. The system of claim 16, wherein the one or more processors are further configured to mapping notes within the music notation to notes within a musical font.

22. The system of claim 16, wherein the one or more processors are further configured to determine an audio rendering of the music object.

* * * * *